April 23, 1935.   H. MÜLLER   1,999,106
TRAVEL SUPPORT DEVICE FOR BEDSTEADS AND THE LIKE
Filed April 17, 1934
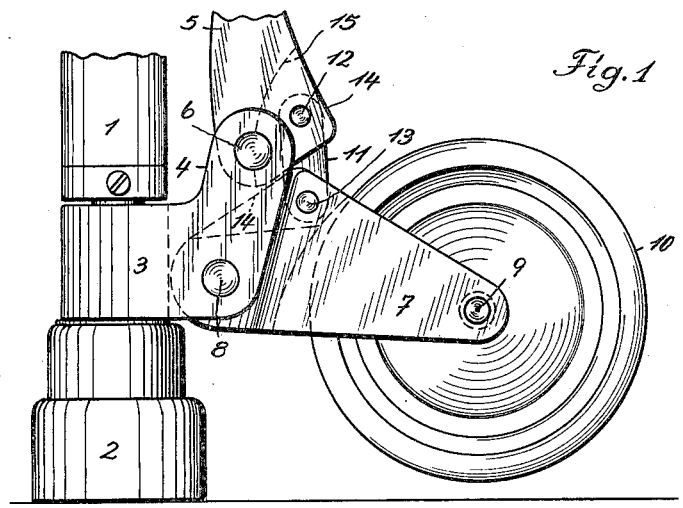
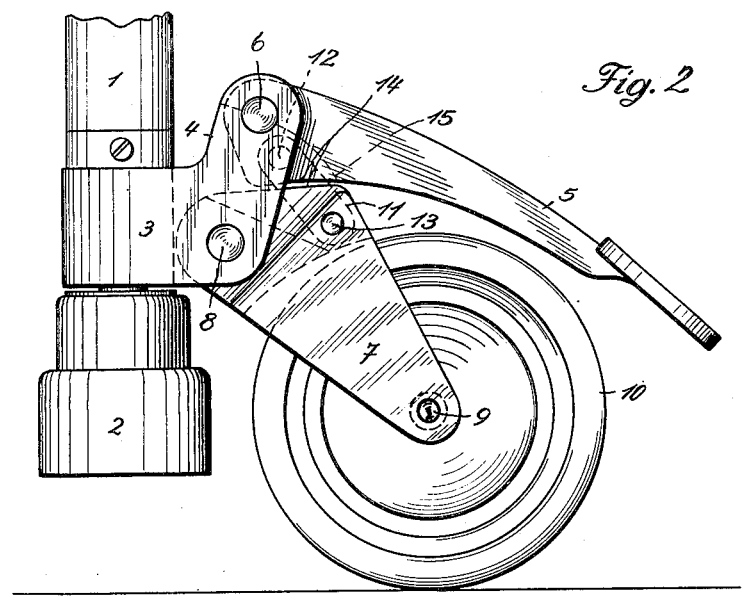
Inventor
HANS MÜLLER
ATTORNEYS Patented Apr. 23, 1935

1,999,106

UNITED STATES PATENT OFFICE 1,999,106

TRAVEL SUPPORT DEVICE FOR BEDSTEADS AND THE LIKE

Hans Müller, Langenfeld, Germany

Application April 17, 1934, Serial No. 721,042

6 Claims. (Cl. 16—34)

This invention relates to travel support devices for bedsteads and the like which are arranged at the foot of the legs of the bedsteads and the like and comprise castor rollers which are adapted to be raised and lowered out of or into the operative position for travelling. In known devices of this kind the castor rollers are carried by arms mounted on the legs of the bedsteads or the like so as to be longitudinally displaceable thereon and hand lever mechanism is provided for actuating the device, this mechanism being such that when the hand lever is depressed the arm carrying the castor roller is displaced on the leg and the bed raised into the travelling position when the castor roller touches the ground.

A disadvantage of the above-described and other travel support devices of the known type lies in the fact that a special sliding bearing surface must be provided on each leg of the bedstead or the like to carry the supporting arm of the castor roller and heretofore it has also been necessary to so construct the hand lever mechanism that the mechanical advantage is of such a low value that in order to place the castor rollers in the travelling position the efforts of a strong person have been necessary.

A further disadvantage of the known supporting devices lies in the fact that before a castor roller can be moved into the travelling position the associated hand lever mechanism must first be actuated.

Among the objects of the invention are to avoid the above-mentioned disadvantages. A further object of the invention is to provide a travel support device in which the castor roller falls automatically into the travelling position under its own weight when the bed or the like is lifted. A further object of the invention is to provide a traveling supporting device provided with a hand lever mechanism having a large mechanical advantage so that the castor roller may be moved into the operative or travelling position by even a woman. A still further object of the invention is to provide a travel supporting device which, when once placed in the travelling position cannot be inadvertently returned to the rest position when the castor roller is thrust, for instance, over a step or an abutment into a position when, for a moment, it swings freely. It is a still further object of the invention to provide a travel supporting device in which the castor roller falls automatically into its travelling position without the hand lever mechanism being actuated when, for instance, the bed is lifted. It is an important object of the invention to provide a travel supporting device which will remain in its travelling or operative position until positively actuated to its rest position, so that an invalid is protected against involuntary jolting.

The travel supporting device according to the invention comprises a castor roller carrying arm constructed in two parts which is pivotable but not longitudinally displaceable on the leg of the bedstead or the like. The arm is divided into two parts, one of which carries the castor roller and is adapted to pivot in a vertical plane about the other part of the arm, which latter part is connected to the said leg, so that when the bed or the like is raised this, the former part, and also the castor roller, falls automatically and the castor moves into the travelling position.

In order to bring the vertically swinging arm part into its lower position by hand without bodily raising the bed, a pressure rod is provided. The pressure rod consists of a hand lever articulated to the part of the arm connected to the leg of the bed or the like and to an intermediate lever which connects the hand lever with the vertically swinging arm part.

The distances between the different axes, particularly between the pivoting axis of the intermediate lever with the hand lever and the axis of the intermediate lever with the vertically swinging arm part are determined so that a high mechanical advantage is obtained.

When the castor roller is placed in the travelling position, the axis of the intermediate lever with the hand lever passes beyond a dead centre position so that the castor roller, even when swinging freely, cannot return to the rest position.

The pressure rod is designed so that the castor roller may fall into its travelling position without the hand lever being actuated and it does not, therefore, matter if the castor roller on one leg of the bedstead or the like is overlooked when the remaining castor rollers are moved into the travelling position, as the moment the castor roller is allowed to swing freely during the actuation of the other castor rollers, it automatically falls also into its travelling position.

A typical form of construction of the apparatus is shown in the accompanying drawing in which—

Fig. 1 shows the castor roller in the position of rest and

Fig. 2 shows the castor roller in the travelling position.

In particular, the reference numeral 1 denotes the leg of the bed or the like which is provided with a supporting leg extension 2. The leg of the bed or a tapered prolongation thereof serves as pivot for an arm 3. The arm 3 is provided with a prolongation 4. This forms the bearing of a hand or foot lever 5 adapted to pivot about an axle 6. On the arm 4 there is also arranged an arm 7 adapted to pivot about an axle 8. By means of an axle 9, the arm 7 carries a castor roller 10 of substantial size. The arm 7 and the lever 5 are connected by a link 11. The link 11 is pivotally connected to the lever 5 at 12 and to the arm 7 at 13. The arms 5 and 7 are bevelled and shaped at 14 in such a manner that, when the castor roller is lowered, they close and rest on one another, and thus form a safe limiting abutment. A further abutment or stop 15 is provided on the arm 5, which when the device is lowered, is likewise moved against the link 11 and presses the pivotal axle 12 over a dead centre position in relation to the axle 6, so that the stop 15 causes an automatic locking of the lowered castor roller 10.

The mode of operation of the apparatus described can be seen from the drawing. The castor roller can be brought into its operative position by the downward movement of the arm 3, but it also suffices if the leg 1 of the bed is raised. In this case the castor roller 10 falls automatically into its operative position, as the hinged connections of the individual lever arms permit this. In both cases the link 11 is moved into a locked dead centre position in relation to the pressure axle 6, so that it is impossible for the castor roller to be turned back without the lever 5 being actuated.

The apparatus described can be modified in many ways without departing from the essential idea of the invention.

I claim:—

1. A travel support device for bedsteads and the like having a leg member, comprising a two-part castor roller-carrying arm of which one part is provided with means for mounting it on said leg member for rotary movement in a horizontal plane only thereon, a castor roller journalled in the other part of said two-part arm, said other part being pivotally mounted on said first mentioned part for movement in a vertical plane, a lever arm pivotally connected to said first mentioned part at a point above the point of pivotal connection of the said two parts, a link pivotally connected to said lever arm and to said other part, the axis of the lever arm being so arranged with respect to the pivot points of the link that the latter moves into its dead centre position when the said other part with the castor roller is allowed to swing freely downwards by lifting the leg.

2. A travel support device for bedsteads and the like having a leg member, comprising a two part castor roller-carrying arm of which one part is provided with means for mounting it on said leg member for rotary movement in a horizontal plane only thereon, a castor roller journalled in the other part of said two-part arm, said other part being pivotally mounted on said first mentioned part for movement in a vertical plane, a hand lever pivotally connected to said first mentioned part at a point above the point of pivotal connection of the said two parts, a link pivotally connected to said hand lever and to said other part, the axis of the hand lever being so arranged with respect to the pivot points of the link that the latter moves into its dead centre position when the said other part with the castor roller is allowed to swing freely downwards by lifting the leg.

3. A travel support device as claimed in claim 1, characterized by an extension on said lever arm, an abutment on said extension engaging with said link to move the latter beyond its dead centre position during the down-swinging movement of the said other part with the castor roller, and a stop on the castor roller-carrying arm engaging with the said lever arm when the link has moved beyond said dead centre position.

4. A travel support device for bedsteads and the like having a leg member, comprising a two-part castor roller-carrying arm of which one part is provided with means for mounting it on said leg member for rotary movement in a horizontal plane only thereon, a castor roller journalled in the other part of said two-part arm, said other part being pivotally mounted on said first mentioned part for movement in a vertical plane, a hand lever pivotally connected to said first mentioned part at a point above the point of pivotal connection of the said two parts and having a lever arm actuated by said hand lever, a link pivotally connected to said lever arm and to said other part, the axis of the hand lever being so arranged with respect to the pivot points of the link that the latter moves into its dead centre position when the said other part with the castor roller is allowed to swing freely by lifting the leg, an abutment carried on the lever handle and engaging with the link to move the latter beyond its dead centre position during the down-swinging movement of the said other part and a stop surface carried on said other part and engaged by the hand lever when the link has moved beyond its dead centre position.

5. A travel support device for bedsteads and the like having a leg member, comprising a two-part castor roller carrying arm of which one part is provided with means for mounting it on said leg member for rotary movement in a horizontal plane only thereon, a castor roller journalled in the other part of said two-part arm, said other part being pivotally mounted on said first mentioned part for movement in a vertical plane, a hand lever pivotally connected to said first mentioned part at a point above the point of pivotal connection of the said two parts, a link pivotally connected to said hand lever and to said other part, whereby said other part with the castor roller is swung downwards with respect to the leg member when the hand lever is swung downwards, the axis of the hand lever being so arranged with respect to the pivot points of the link that the latter moves into its dead centre position when the said other part is swung downwards, an abutment carried on the hand lever and engaging with the link to move the latter beyond its dead centre position, and a stop surface carried by said other part and engaged by the hand lever when the link has moved beyond its dead centre position.

6. A travel support as claimed in claim 2, characterized by the point of pivotal connection of the said two parts being arranged immediately adjacent the mounting means on the leg member and that the distance between the said point of pivotal connection of the two parts and the point of connection of the link with the said other part is greater than the distance between the point of connection of the link with the lever handle and the axis of the lever handle.

HANS MÜLLER.